Figure 1:
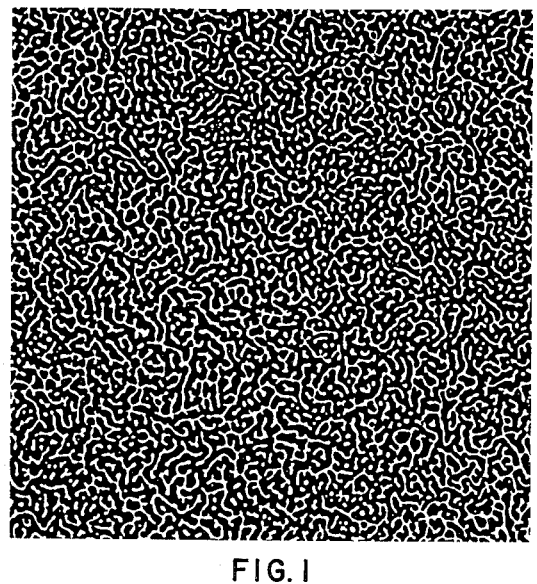

BURTON RAMBERGER, INVENTOR

United States Patent Office 3,214,286
Patented Oct. 26, 1965

3,214,286
PATTERNED FINISH AND METHOD OF
APPLYING THE SAME
Burton Ramberger, Leonardo, N.J., assignor, by mesne assignments, to M&T Chemicals Inc., New York, N.Y., a corporation of Delaware
Filed Aug. 28, 1961, Ser. No. 134,242
13 Claims. (Cl. 117—41)

This invention relates to a novel decorative finish and to a novel method of applying the same. It more particularly relates to a decorative protective surface coating characterized by its multicolored surface.

Ornamental paints, enamels, and lacquers of different colors tend to merge one into another when applied to a surface simultaneously and, due to flowing and spreading, they may undergo such diffusion as to confuse and/or obscure any contrast between the different colors of the components. Prior art methods employed for overcoming these disadvantages included the steps of applying to the surface to be covered a colored first coating composition, drying this coating, and then repeating the procedure with partial coatings of different colors as many times as desired. This is a time-consuming and costly procedure which has not proven to be completely satisfactory.

Attempts have been made to produce multicolor coatings by attempting to mix the various color components without merging one with another, and applying this mixture to the surface to be coated. However, the individual colors of such a mixture tend to merge into one another and do not produce patterns with the desired separation of individual colors. Attempts have also been made to produce such a multicolor or plural-color coating by dispersing the individual colors in a liquid, such as water, in which they are relatively immiscible. However, such coatings possess inherent limitations which make their use excessively costly and often unsatisfactory in result.

It is an object of this invention to provide an improved decorative finish and a method of applying the same. It is another object of this invention to provide a multi-color finish wherein each color may be separate and discrete. Other objects will be apparent to those skilled in the art on inspection of the following description.

In accordance with certain of its aspects, the process of this invention for forming a decorative finish on a surface comprises applying to said surface a first component including a vinyl resin in a first solvent; applying to said surface, before said first component is dry, a second component including an epoxy resin in a second solvent, said second solvent being substantially miscible with said first solvent; drying said first and second components thereby forming on said surface a coating characterized by a pattern containing discrete areas of said epoxy resin and of said vinyl resin; and fixing said containg thereby forming a hard, durable finish.

In practice of the instant invention, the first component of the decorative finish may include a vinyl resin. Typical vinyl resins which may be employed include polymers of vinyl chloride or vinyl acetate; vinyl copolymers including for example the copolymer of vinyl chloride and vinyl acetate; modified vinyl resins including maleic modified vinyl chloride-vinyl acetate polymer; etc. Typically these materials may be thermoplastic resins. Illustrative specific resins which may be employed include the Bakelite VMCH brand of maleic modified vinyl chloride-vinyl acetate copolymer; the Bakelite VYHH brand of vinyl chloride-vinyl acetate copolymer; etc. Other equivalent resins may be employed.

A preferred first component may include as the vinyl resin 50–95, say 50 parts of a copolymer of vinyl chloride-vinyl acetate per 5–50, say 50 parts of a maleic modified vinyl chloride-vinyl acetate copolymer.

The first solvent which may be used in the first component will be one in which the vinyl resin is readily soluble. In the first component, it is preferred that there be 15–25, say 22 parts by weight of resin per 75–86, say 78 parts of solvent.

Typical solvents which may be employed in the first component in practice of this invention may include, either alone or as mixtures, ketones including methyl isobutyl ketone, methyl ethyl ketone, cyclohexanone, etc.; esters including ethyl acetate, butyl acetate, cellosolve acetate, etc.; and aromatic hydrocarbons including xylol, benzol, and toluol. When hydrocarbon solvents are employed, they will preferably be present in mixture with ketones or esters in amount of the latter sufficient to insure solubility of the vinyl resin. These solvents will readily dissolve the preferred vinyl chloride-vinyl acetate copolymer resin which may be present in the first component. In the preferred embodiment, a mixture of methyl isobutyl ketone and xylol may be employed.

In practice of one embodiment of this invention, at least one of the constituents present in the solvent system of the first component may be a slow solvent typified by cyclohexanone, diacetone alcohol, isophorone, etc. A slow solvent may be one which has a low rate of evaporation when tested by the Bent-Wik Test described in Ind. Eng. Chem. 28, 316 (1936). Preferably those slow solvents which may be employed will have a Bent-Wik index less than about 40.

The first component may also preferably include a resin stabilizer for the vinyl resin, typically the polymer formed by reacting bisphenol A with epichlorhydrin and sold by Union Carbide under the trademark ERL 2774; or dibutyltin di-2-ethyl hexoate; dibutyltin dichloride, or dibutyltin maleate. The resin stabilizer may be present in amount of 0.03 to 0.05, say 0.04 part per part of vinyl resin. The preferred resin stabilizer may be the ERL 2774 brand epoxy resin noted supra which may be present in amount of 0.04 part per part of the resin.

In the preferred embodiment, the first component will include a pigment, typically titanium dioxide, iron oxide, phthalocyanine green, or carbon black. The pigment may preferably be present in amount of 0.1%–5%, say 2% by weight of the first component.

In practice of this invention, the first component may include the following constituents in the preferred ranges as indicated:

| Constituent | Minimum | Maximum |
|---|---|---|
| Vinyl resin | 15 | 25 |
| Total solvent | 75 | 86 |
| (Including slow solvent | 10 | 40) |
| Vinyl resin stabilizer | 0.005 | 0.01 |
| Pigment | 0.1 | 5 |

A typical preferred first component may include the following ingredients:

| Resin | Parts by weight |
|---|---|
| Maleic modified vinyl chloride-vinyl acetate copolymer solution type (Union Carbide Bakelite VMCH–2 brand) | 11.0 |
| Vinyl chloride-vinyl acetate copolymer (Union Carbide Bakelite VYHH brand) | 11.0 |
| First solvent: | |
| Methyl isobutyl ketone | 39.0 |
| Xylol | 27.0 |
| Cyclohexanone (slow solvent) | 11.0 |
| Resin stabilizer: | |
| Epichlorhydrin-bisphenol A polymer (Union Carbide ERL 2774 brand) | 0.8 |
| Propylene oxide | 0.2 |
| | 100.0 |

The first component may be diluted with solvent e.g. methyl isobutyl ketone to reduce the viscosity to a point suitable for application as by spraying. Preferred viscosity may be 130 to 150, say 140 cp. measured at 20° C.

The second component of the decorative finish may include an epoxy-type resin. Typical epoxy resins which may be employed include those resins formed by the reaction-polymerization of epichlorhydrin and bisphenol A typically those sold under the trademarks DER 667 of Dow Chemical Co.; and Araldite 6097 of Ciba Chemical Co. One preferred epoxy-type resin which may be employed in practice of this invention may be the resin formed by the reaction of epichlorhydrin and bisphenol A (Shell Epon 1007 brand resin). Other equivalent resins may be employed.

Preferably the second component of the decorative finish may also include an aminoplast-type resin such as a urea-formaldehyde-type resin. Typical of such resins may be the Reichhold Beckamine P–196–60 brand of butylated urea-formaldehyde resin; Rohm and Haas Uformite F–240 brand of urea-formaldehyde resin, and Rohm and Haas Uformite F–158 brand of propylated urea-formaldehyde resin. Other equivalent resins may be employed.

The epoxy-type resin may be present in amount of 60–90, say 75 parts per 10–40, say 25 parts of urea-formaldehyde-type resin.

The second solvent which may be used in the second component of the finish will be one in which the resins, i.e. the epoxy resin and the aminoplast urea-formaldehyde resin are readily soluble. Preferably there may be 20–45, say 40 parts of resin per 55–80, say 60 parts of solvent.

Typical solvents which may be employed in the second component in practice of this invention may include, either alone or in mixtures, ketones including methyl isobutyl ketone, methyl ethyl ketone, cyclohexanone, etc.; esters including ethyl acetate, butyl acetate, cellosolve acetate, etc.; and aromatic hydrocarbons including xylol, benzol, and toluol. When hydrocarbon solvents are employed, they will be present in mixture with ketones or esters in amount of the latter sufficient to insure solubility of the resins. These solvents will readily dissolve the preferred resin which may be present in the second component. This solvent of the second component will be substantially and preferably completely miscible with the solvent of the first component. In the preferred embodiment, the second solvent may contain the same ingredients as the first solvent (although not necessarily in the same proportion).

It is a feature of this invention that the vinyl resin of the first component will be soluble in the second solvent, and the preferred mixture of epoxy resin and aminoplast urea-formaldehyde resin of the second component will be soluble in the first solvent.

In the preferred embodiment, the second component will include a pigment, typically titanium dioxide, iron oxide, phthalocyanine green, or carbon black. The pigment may preferably be present in amount of 0.1%–5%, say 2% by weight of the second component mixture.

In practice of this invention, the second component may include the following constituents in the preferred parts by weight as indicated:

| Constituent | Minimum | Maximum |
|---|---|---|
| Epoxy resin | 10 | 40 |
| Aminoplast | 1 | 27 |
| Solvent | 12 | 68 |
| Pigment | 0.1 | 5 |

A typical preferred second component mixture may include the following ingredients:

| Resin: | Parts by weight |
|---|---|
| Epoxy resin (Shell Epon 1007 brand resin) | 23.6 |
| 50% solution in xylol-butanol of butylated urea-formaldehyde resin) Reichhold Beckamine P–196–60 brand resin) | 16.4 |
| Second solvent: | |
| Methyl isobutyl ketone | 22.0 |
| Xylol | 32.6 |
| Cellosolve acetate | 5.4 |
| | 100.0 |

The second component may be diluted with solvent e.g. methyl isobutyl ketone, to reduce the viscosity to a point suitable for application as by spraying. Preferred viscosity may be 135 to 145, say 140 cp. measured at 20° C. A smaller pattern i.e. finer apparent grain structure may be obtained by diluting the first and second components to a viscosity falling in the lower portion of the noted ranges.

The method of applying the first component and the second component to form the novel patterned finish of this invention includes the steps of applying the first component to the surface to be coated, and before that component is dry, applying the second component to the surface to be coated. In accordance with one embodiment of the process of this invention, the first composition may be sprayed onto the surface to form a layer typicaly 1–1.5, say 1 mil thick. Typically, this coat might dry on contact with ambient air in 2 to 10, say 5 minutes to a tacky coating; and complete drying would typically be attained after 20–30, say 25 minutes. The first component may be applied as a continuous coating to cover the entire area of the surface to be coated.

The second component of the novel patterned finish of this invention may be applied to the first component at a time which may be less than about 5%–50%, say 5% of the time in which the first component would become tacky. Although the second component may be applied 15–120, say 15 seconds after the first component has been applied, it is preferred that it be applied immediately thereafter i.e. less than 5–10 seconds thereafter. The second component may preferably be applied in amount sufficient to form a film of thickness substantially equal to that of the first component.

It is a feature of this invention that the first and second component may be applied simultaneously as by spraying each component through a different nozzle of a spray gun or by spraying through one nozzle of a spray gun an intimate mixture of the two components. Where the surface to which the coating is to be applied is essentially horizontal, the two-coat technique may preferably be employed wherein the first component is applied and then the second component is applied. Where the surface to be coated is vertical, the one-step technique wherein the two components may be sprayed simultaneously may be employed.

Because of the properties of the first component and the second component, and in particular their attraction for the base surface on which they may be applied, their repellance of each other, and the ability of one component to pass through a film of the other, the coalescing films form more-or-less small and clearly delineated areas of each component over the entire face of the base surface and over smaller areas thereon to produce a variegated pattern on the surface.

The apparent grain structure, i.e. the fineness or the coarseness of the pattern may be determined by the length of time in which the components remain in a fluid state prior to becoming tacky or dry. More specifically this may be regulated by controlling the viscosity and/or the surface tension of the components. This in turn may be regulated by the particular solvents employed; the amount of solvents; the nature i.e. the Bent-Wik index of the solvents; the temperature of the plate on which the coating is to be applied; the temperatures of the components during application; and the rate, time and temperature of drying.

Because of the mutual miscibility of the solvents of the two components, the later-applied component, typically the epoxy component, during or after the formation of the "island droplets" of irregular shape, passes through the vinyl phase and establishes contact with the surface on which the coating is applied. Thus, the deposited coating, if deposited for example on a transparent surface, may appear to be substantially the same whether viewed from "above" or "below."

The coating so deposited on the surface may be dried, preferably by contact with ambient air at 20° C.–30° C., say 25° C., for 15–30 minutes, say 30 minutes during which time substantially all of the solvent may evaporate. Higher temperatures e.g. up to 100° C. may be employed with attendant decrease in drying time. During this evaporation, the so-called multicolor pattern will become fixed in final form.

The dried coating on which the plural-color pattern has formed may then be set or fixed preferably by baking. Preferably baking may be carried out at 160° C.–180° C., say 170° C. for 10–20 minutes, say 15 minutes. During baking, last traces of solvent are removed, the epoxy resin may be fixed or set by the reaction with the aminoplast resin, urea-formaldehyde resin, which is preferably present, and the vinyl areas will be blended or fused into the edges of the epoxy areas, although not in amount sufficient to eliminate the sharp delineation which characterizes the pattern. Fixing of the epoxy resin may be effected by other techniques including catalytic techniques as will be apparent to those skilled in the art.

In accordance with this invention, the novel patterned decorative, variegated or multicolored finish on a surface may comprise a vinyl resin bonded to said surface, and an epoxy resin bonded to said surface, each of said resins being present in clearly delineated areas over the entire area of said surface and over smaller areas thereon, said resins being bonded to each other along their clearly delineated lines of contact.

In practice of one embodiment of this invention, the vinyl resin phase and the epoxy resin phase may each be substantially continuous phases on said surface. In accordance with another embodiment of this invention, one of these phases may be substantially continuous and the other may be a substantially discontinuous phase characterized by discrete islands. The degree of continuity of the phases may be varied depending upon the viscosity, surface tension, solvent, resin composition, etc.

It is a feature of the novel finish of this invention that each of the resin phases, whether continuous or discontinuous, whether formed from the first component or the second component or simultaneously in the one-step technique, directly contacts the surface on which the patterned finish is formed. This permits attainment of a strong bond which minimizes flaking or other separation of the coating from the surface.

The high degree of integrity of the surface of this multicolored pattened finish may be attributed at least in part to the fusion which occurs at the edges of the vinyl resin phase and the epoxy resin phase whereby the two phases are securely bonded to each other. This bonding between the phases contributes greatly to the integrity of the surface and thus to the long life under adverse conditions. It is also a feature of this invention that this high degree of bonding is attained with substantially little or no loss of discreteness i.e. each of the two phases, which in the preferred embodiment may be of different color, will retain its color wihtout any substantial overlap or bleeding between phases.

Practice of this invention according to certain of its embodiments may be observed from the following examples.

*Example 1*

In accordance with this example, the typical preferred first component hereinbefore set forth, diluted with methyl isobutyl ketone to a viscosity of 140 cp. measured at 20° C. was sprayed onto a flat metal plate. This material had been pigmented with 1% by weight (prior to dilution) of carbon black. Substantially immediately thereafter, i.e. after about 15 seconds, the typical preferred second component hereinbefore set forth, pigmented with 2% by weight of titanium dioxide and diluted with methyl isobutyl ketone to a viscosity of 140 cp. measured at 20° C. was sprayed onto the first component. The second component appeared at first to completely hide the first component. After about 30–60 seconds, the epoxy resin component appeared to form a discontinuous phase on a substantially continuous vinyl phase.

The coating was air-dried at 25° C. for 30 minutes during which time solvent evaporated. The multicolor coating was then baked at 170° C. for 15 minutes to form the finished product shown in FIG. 1.

*Example 2*

Figure 2:
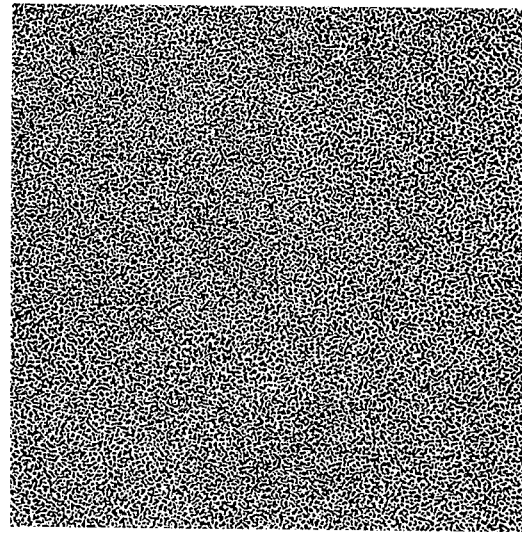

In accordance with this example, the typical preferred first and second components hereinbefore set forth in Example 1 were simultaneously sprayed from a De Vilbiss JGA Spray Gun equipped with a 704 air cap, an AV 15 fluid tip, and a 402 FF needle. The pressure on the liquids fed to the spray gun was 12–15 p.s.i.g. and atomization air pressure was 50–60 p.s.i.g. Substantially immediately, i.e. after about 5 seconds, the phases appeared to be separate and the pattern was quickly formed thereafter. The single coat was air-dried for 30 minutes at 25° C. and backed at 170° C. for 15 minutes. The coating so formed is shown in FIG. 2. It appears that the epoxy composition is present as the substantially continuous phase and the vinyl component is present as the non-continuous phase. Both phases are directly bonded to the surface.

As many embodiments of this invention may be made without departing from the spirit and scope thereof, it is to be understood that the invention includes all such modifications and variations as come within the scope of the appended claims.

I claim:

1. The method of forming a decorative finish on a surface which comprises applying to said surface a first component including a vinyl resin in a first solvent; applying to said surface, before said first component is dry, a second component including an epoxy resin in a second solvent, said second solvent being substantially miscible with said first solvent; drying said first and second components thereby forming on said surface a coating characterized by a pattern containing discrete areas of said epoxy resin and of said vinyl resin; and fixing said coating thereby forming a hard durable finish.

2. The method of forming a decorative finish on a surface as claimed in claim 1 wherein said first component contains a vinyl resin selected from the group consisting of polymers and copolymers of vinyl chloride and vinyl acetate.

3. The method of forming a decorative finish on a surface as claimed in claim 1 wherein said epoxy resin is a polymer of bisphenol A and epichlorhydrin.

4. The method of forming a decorative finish on a surface as claimed in claim 1 wherein said first solvent and said second solvent contain the same ingredients.

5. The method of forming a decorative finish on a surface as claimed in claim 1 wherein said vinyl resin component is applied to said surface prior to the application of said epoxy resin component.

6. The method of forming a decorative finish on a surface as claimed in claim 1 wherein in said vinyl resin component and said epoxy resin component are simultaneously applied to said surface.

7. The method of forming a decorative finish on a surface as claimed in claim 1 wherein said first component is applied to said surface, and said epoxy component is applied to said surface at a later time which is less than 50% of the time for said first component to become tacky.

8. The method of forming a decorative finish on a surface as claimed in claim 1 wherein said second epoxy component is applied to said surface immediately after said first component is applied to said surface.

9. The method of forming a decorative finish on a surface as claimed in claim 1 wherein said dried first and second components are fixed after drying.

10. The method of forming a decorative finish on a surface as claimed in claim 1 wherein said fixing is effected by baking at 160° C.–180° C.

11. The method of forming a multicolored decorative finish on a surface which comprises applying to said surface a first component including a vinyl resin in a first solvent; applying to said surface, before said first component is dry, a second component including an epoxy resin in a second solvent, said second solvent being substantially miscible with said first solvent; one of said first component and said second component also including a pigment present to the extent of 0.1–5% by weight of the component; drying said first and second components thereby forming on said surface a coating characterized by a pattern containing discrete areas of said epoxy resin and of said vinyl resin; and fixing said coating thereby forming a hard durable finish.

12. The decorative finish on a surface formed by the process of claim 1.

13. The multicolored decorative finish on a surface formed by the process of claim 11.

References Cited by the Examiner

UNITED STATES PATENTS

| | | | |
|---|---|---|---|
| 2,385,920 | 10/45 | Jenkins | 106—170 |
| 2,714,560 | 8/55 | Hookway | 117—41 |
| 2,756,394 | 7/56 | Sieven et al. | 117—161 |
| 2,901,377 | 8/59 | Bode | 117—72 |
| 2,977,264 | 3/61 | Shapero et al. | 117—161 |
| 3,041,195 | 6/62 | Salwert et al. | 117—41 |

FOREIGN PATENTS 681,982  11/52  Great Britain.

RICHARD D. NEVIUS, *Primary Examiner.*